(12) United States Patent
Maesen et al.

(10) Patent No.: US 7,037,422 B2
(45) Date of Patent: May 2, 2006

(54) PROCESS FOR PRODUCING HIGH RON GASOLINE USING CFI ZEOLITE

(75) Inventors: Theo Maesen, Rodeo, CA (US); Tom Harris, Benicia, CA (US)

(73) Assignee: Chevron U.S.A. Inc, San Ramon, CA (US)

( * ) Notice: Subject to any disclaimer, the term of this patent is extended or adjusted under 35 U.S.C. 154(b) by 444 days.

(21) Appl. No.: 10/374,297

(22) Filed: Feb. 25, 2003

(65) Prior Publication Data

US 2004/0163998 A1    Aug. 26, 2004

(51) Int. Cl.
*C10G 47/02* (2006.01)
*C07C 5/13* (2006.01)
*C07C 4/02* (2006.01)
*C07C 7/12* (2006.01)

(52) U.S. Cl. ............... 208/108; 208/111.35; 585/734; 585/737; 585/752; 585/820

(58) Field of Classification Search ............... 208/108, 208/111.35; 585/734, 737, 752, 820
See application file for complete search history.

(56) References Cited

U.S. PATENT DOCUMENTS

| | | | |
|---|---|---|---|
| 5,107,052 A | 4/1992 | McCulloch et al. | |
| 6,040,258 A | 3/2000 | Yoshikawa et al. | |
| 6,043,179 A | 3/2000 | Davis et al. | |

FOREIGN PATENT DOCUMENTS

| EP | 1136121 A2 | 3/2001 |
|---|---|---|
| WO | WO 99/08961 | 2/1999 |

OTHER PUBLICATIONS

G.G. Podrebarac, et al., "More Uses for Catalytic Distillation" in Chemtech, May 1997, pp. 37-45, 0009-2703/97 1997 American Chemical Society.

D.S. Santilli et al., "Inverse Shape Selectivity in Molecular Sieves: Obervations, Modelling, and Predictions", Microporous Materials, 1 (1993), pp. 329-341, Elsevier Science Publishers B.V., AMSTERDAM, 0927-6513/93—Elsevier Science Publishers B.V.

Merijn Schenk et al., "Understanding Zeolite Catalysis: Inverse Shape Selectivity Revised", Angew. Chem. Int. Ed. 2002, 41. No. 14, pp. 2499-2502.

*Primary Examiner*—Tam Nguyen
(74) *Attorney, Agent, or Firm*—James W. Ambrosius

(57) ABSTRACT

A process for producing a high RON naphtha which comprises contacting a hydrocarbon feed stream comprising a mixture of the isomers of $C_5$ and $C_6$ paraffins with a CFI zeolite, such as CIT-5, in an adsorption zone, whereby the branched isomers of the $C_5$ and $C_6$ paraffins are preferentially adsorbed by the CFI zeolite as compared to the straight chain isomers, and recovering a naphtha product from the adsorption zone having a higher RON than the hydrocarbon feed stream, also including a hydroisomerization process and a hydrocracking process.

22 Claims, No Drawings

PROCESS FOR PRODUCING HIGH RON GASOLINE USING CFI ZEOLITE

CROSS REFERENCE TO RELATED APPLICATION

This Application is related to Applicants' co-pending U.S. patent application Ser. No. 10/373,996 filed on Feb. 25, 2003 titled "Process For Producing High RON Gasoline Using ATS Zeolite".

FIELD OF THE INVENTION

The invention relates to the production of high RON gasoline using CFI zeolite.

BACKGROUND OF THE INVENTION

Modern automobile engines require high octane gasoline for efficient operation. Previously lead had been added to gasoline to increase the octane number. However, with the removal of lead from the gasoline pool due to environmental concerns, other methods for increasing the octane number are needed. The addition of oxygenates, such as methyl-t-butyl ether (MTBE) and ethanol, may be added to gasoline to increase the octane number. However, MTBE, while generally less toxic than lead, has been linked to ground water contamination. At the same time, some of the high octane components normally present in gasoline, such as benzene, aromatics, and olefins, must also be reduced. Obviously, a process which will increase the octane of gasoline without the addition of toxic or environmentally adverse substances would be desirable.

For a given carbon number of a light naphtha component, the shortest, most branched isomer tends to have the highest octane number. For example, the branched isomers of hexane, monomethylpentane and dimethylbutane, have octane numbers that are significantly higher than that of n-hexane, with dimethybutane having the highest RON. Likewise, the branched isomer of pentane, methylbutane, has a significantly higher RON than n-pentane. By increasing the proportion of these high octane isomers in the gasoline pool satisfactory octane numbers may be achieved for gasoline without additional additives. Adsorbents, such as zeolite 5A, which are selective for the least bulky, lowest RON isomers are known and have been employed in commercial processes following an isomerization operation in order to separate the high RON isomers from the low RON isomers present in light naphtha. In a different approach, U.S. Pat. No. 5,107,052 describes a process for increasing the octane number of gasoline by isomerizing the $C_5$ and $C_6$ paraffins and then selectively adsorbing the dimethylbutane using a molecular sieve selected from the group consisting of $AlPO_4$-5, SAPO-5, SSZ-24, MgAPO-5, and MAPSO-5. In each of these approaches the high RON isomers recovered are added to the gasoline pool to increase the octane number. The low RON isomers which are recovered separately may be recycled to the isomerization operation.

Two methods for calculating octane numbers are currently being used, the Motor-method octane number (MON) determined using ASTM D2700 and the Research-method octane number (RON) determined using ASTM D2699. The two methods both employ the standard Cooperative Fuel Research (CFR) knock-test engine, but the values obtained are not identical. Sometimes the MON and RON are averaged, (MON+RON)/2, to obtain an octane number. Therefore, when referring to an octane number, it is essential to know which method was used to obtain the number. In this disclosure, unless clearly stated otherwise, octane number will refer to the RON.

For the purpose of comparison, the isomers of hexane and pentane have the following RON's:

| | |
|---|---|
| n-pentane | 61.7 |
| methylbutane | 92.3 |
| n-hexane | 24.8 |
| 2-methylpentane | 73.4 |
| 3-methylpentane | 74.5 |
| 2,2-dimethylbutane | 91.8 |
| 2,3-dimethylbutane | 101.0 |

In this disclosure, the isomers 2-methylpentane and 3-methylpentane will be collectively referred to as monomethylpentane. Likewise the isomers 2,2-dimehtylbutane and 2,3-dimethybutane will be collectively referred to as dimethylbutane. The monomethyl isomer of pentane will be referred to as methylbutane. The isomers of $C_5$ and $C_6$ paraffin are included in the light naphtha fraction of the gasoline pool. One skilled in the art will recognize that some isomers of $C_7$ paraffin may also be present in the light naphtha fraction; however, since heptane and its isomers are generally only present in minor amounts, they will be ignored in the following discussion of the present invention.

Gasoline is generally prepared from a number of blend streams. Gasoline blending streams typically have a normal boiling point within the range of 0 degrees C. (32 degrees F.) and 260 degrees C. (500 degrees F.) as determined by an ASTM D86 distillation. Feeds of this type include light naphthas typically having a boiling range of from about 15 degrees C. to about 70 degrees C. (about 60 degrees F. to about 160 degrees F.); full range naphthas, typically having a boiling range of about $C_5$ to 180 degrees C. (355 degrees F.), heavier naphtha fractions boiling in the range of about 125 degrees C. to 210 degrees C. (260 degrees F. to 412 degrees F.), or heavy gasoline fractions boiling at, or at least within, the range of about 165 degrees C. to 260 degrees C. (330 degrees F. to 500 degrees F.), preferably from about 165 degrees C. to 210 degrees C. (330 degrees F. to 412 degrees F.). In general, a gasoline fuel will distill over the range of from about room temperature to 260 degrees C. (500 degrees F.). The gasoline pool typically includes butanes, light straight run, isomerate, FCC cracked products, hydrocracked naphtha, coker gasoline, alkylate, reformate, added ethers, etc. Of these, gasoline blend stocks from the FCC, the reformer and the alkylation unit account for a major portion of the gasoline pool. FCC gasoline, and if present, coker naphtha and pyrolysis gasoline, generally contribute a substantial portion of the pool sulfur.

Gasoline suitable for use as fuel in an automobile engine should have a RON of at least 80, preferably at least 85, and most preferably 90 or above. High performance engines may require a fuel having a RON of about 100. Most gasoline blending streams will have a RON ranging from about 55 to about 95, with the majority falling between about 80 and 90. Obviously, it is desirable to maximize the amount of methylbutane and dimethylbutane in the gasoline pool in order to increase the overall RON. The present invention is directed to this problem.

CFI zeolites are a molecular sieve having 14-ring pores. In general, CFI-type zeolites include silicate-series crystalline microporous materials, such as crystalline aluminosilicates, crystalline metallo-silicates, and crystalline metallo-aluminosilicates having the CIT-5 (CFI) structure.

CIT-5 is described and its preparation is taught in U.S. Pat. No. 6,040,258. See also European Patent Application EP 1136121A2 and PCT Application WO 99/08961. The art also teaches the use of CIT-5 as an isomerization and hydrocracking catalyst. However, the ability of CFI zeolites generally, and CIT-5 in particular, to preferentially adsorb methylbutane and dimethylbutane as compared to the other isomers of $C_5$ and $C_6$ paraffins has not been previously described and makes it possible to operate isomerization and hydrocracking operations in a highly efficient mode which was not recognized in the prior art.

As used in this disclosure the words "comprises" or "comprising" are intended as open-ended transitions meaning the inclusion of the named elements, but not necessarily excluding other unnamed elements. The phrases "consists essentially of" or "consisting essentially of" are intended to mean the exclusion of other elements of any essential significance to the composition. The phrases "consisting of" or "consists of" are intended as transitions meaning the exclusion of all but the recited elements with the exception of only minor traces of impurities.

BRIEF DESCRIPTION OF THE INVENTION

In its broadest aspect the present invention is directed to a process for producing a high RON naphtha which comprises contacting a hydrocarbon feed stream comprising a mixture of the isomers of $C_5$ and $C_6$ paraffins with CFI zeolite in an adsorption zone, whereby the branched isomers of the $C_5$ and $C_6$ paraffins are preferentially adsorbed by the CFI zeolite as compared to the straight chain isomers, and recovering a naphtha product from the adsorption zone having a higher RON than the hydrocarbon feed stream. In carrying out the process the naphtha product will preferably have a RON at least 2 octane numbers higher than the hydrocarbon feed stream.

The present invention is also directed to a process for isomerizing a light naphtha feed stream comprising isomers of $C_5$ and $C_6$ paraffins which comprises contacting the light naphtha feed stream with an CFI zeolite in a hydroisomerization zone under hydroisomerization conditions, whereby the isomer methylbutane is preferentially formed as compared to n-pentane and the isomer dimethylbutane is preferentially formed as compared to monomethylpentane and n-hexane, and recovering from the hydroisomerization zone by catalytic distillation a naphtha product stream enriched with methylbutane and dimethylbutane. Another embodiment of the invention may be described as a process for preparing gasoline having a high RON and low oxygenates which comprises contacting a hydrocarbon feed stream in a hydrocracking zone with a hydrocracking catalyst under hydrocracking conditions, wherein the hydrocracking catalyst comprises an CFI zeolite, an active hydrocracking catalyst, and a hydrogenation component, and recovering from the hydrocracking zone a methylbutane and dimethylbutane enriched naphtha product.

In carrying out the process of the present invention the preferred CFI zeolite is CIT-5.

Although each of the three embodiments of the invention described above involves processes which are generally treated differently in the art, it is believed that the same mechanism is operative in each process. Although not well understood in the art, the mechanism of the invention relates to the ability of the CFI zeolite generally, and CIT-5 in particular, to preferentially adsorb methybutane and dimethylbutane as compared to pentane, monomethylpentane and n-hexane. The pores of CIT-5 have been found to admit all of the $C_5$ and $C_6$ paraffin isomers, however, the shorter chains of the methylbutane and dimethylbutane are favored over the longer chains of n-pentane, n-hexane and monomethylbutane. Consequently, it is possible to preferentially adsorb those isomers having the highest RON. The methylbutane and dimethylbutane subsequently may be recovered as part of an enriched naphtha product. Preferably, the enriched naphtha product should have a RON of at least 85.

When the CFI zeolite is used in a process for the simple separation of the methylbutane and dimethylbutane from the other isomers of $C_5$ and $C_6$ paraffins, the zeolite may be employed without any active metals being added. However, when using the CFI zeolite as a hydroisomerization catalyst, it is usually desirable to add an active metal selected from Group VIIIA of the Periodic Table of the Elements. When referring to the Periodic Table of the Elements in this disclosure, the version according to the 1975 rules of the International Union of Pure and Applied Chemistry is the one referred to herein. The preferred metals include platinum or palladium or a combination of platinum and palladium. In the hydroisomerization process, the methylbutane and dimethylbutane may be readily recovered from the column by using catalytic distillation, since the isomers having the highest RON also have a lower boiling point than the other corresponding $C_5$ and $C_6$ paraffin isomers.

When the CFI zeolite is used in a hydrocracking operation, the zeolite is mixed with an active hydrocracking catalyst favoring the production of naphtha, such as, for example, Y-zeolite. Although the CFI zeolite may have some cracking activity of its own, its primary purpose in the cracking operation is to adsorb the $C_5$ and $C_6$ paraffin isomers present in the hydrocracking zone. In addition, the CIT-5 will preferentially isomerize the n-pentane to methylbutane and isomerize the n-hexane and monomethylpentane to dimethylbutane which will further increase the RON of the effluent from the hydrocracking operation. Thus by including the CFI zeolite in the hydrocracking catalyst, a methylbutane and dimethylbutane enriched naphtha product can be recovered which may be used to prepare gasoline having an acceptable RON without the addition of oxygenates. The mixture of the CFI zeolite and cracking catalyst preferably will also contain a hydrogenation component, such as an active metal selected from Group VIIIA and/or Group VIB of the periodic Table of the Elements.

When the process of the invention is being used as part of a simple separation operation to recover the methylbutane and dimethylbutane from the hydrocarbon feed stream or when the process is being used as part of a hydroisomerization operation, the feed stream preferably will be a light naphtha stream in order to minimize the volume of material passing through the operation. When the process is being employed in a hydrocracking operation heavier feeds would obviously be employed which are cracked into products boiling in the range of naphtha. Although the CFI zeolite may be used in either a single stage or two stage hydrocracking operation, the CFI zeolite is most advantageously employed in the second stage of a two-stage hydrocracking operation in order to minimize coking of the catalyst.

DETAILED DESCRIPTION OF THE INVENTION

In this disclosure the term "CFI-type zeolite" means a zeolite having a framework structure similar to that of the CIT-5 zeolite first synthesized by Yoshikawa and Davis and disclosed in U.S. Pat. Nos. 6,043,179, and 6,040,258 which are hereby incorporated by reference in their entirety. The CIT-5 framework structure was determined by Wagner et al. and is discussed in *Chem. Commun.*, 2179–2180 (1997). The Structure Commission of the International Zeolite Association gives codes consisting of three alphabetical letters to zeolites which have had their structures determined, and zeolites having the same topology are generically called by such three letters. The code CFI is given to the structure of CIT-5, and therefore it is general to those zeolites having a framework structure similar to that of CIT-5 are named a CFI-type zeolite.

In general, CFI-type zeolites refer to silicate-series crystalline microporous materials, which include crystalline alumino-silicates, crystalline metallo-silicates, and crystalline metallo-aluminosilicates having the CIT-5 (CFI) structure. Metallo-silicates and metallo-aluminosilicates mean herein aluminosilicates; part or all of aluminum therein are replaced with other metals than aluminum, other metals which include gallium, iron, titanium, boron, cobalt, and chromium. Elements forming the framework structure other than silicon and oxygen, for example, aluminum, gallium, iron, titanium, boron, cobalt, and chromium are referred to as heteroatoms.

CIT-5 is a zeolite having a 14 atom pore structure. The zeolite is preferably obtained in its silicate or aluminosilicate form. Its preparation and characteristics are described in U.S. Pat. No. 6,040,258, the text of which is incorporated herein by reference for all purposes. In general, the zeolite is described as a zeolite of an oxide of a tetravalent element or mixture of oxides of a tetravalent element and, optionally, an oxide of a trivalent element or mixture of the oxides of a trivalent element. The term "silicate" refers to a zeolite having a high mole ratio of silicon oxide relative to aluminum oxide, preferably a mole ration greater than 100. As used herein the term "aluminosilicate" refers to a zeolite containing both alumina and silica. Representative X-ray diffraction lines for the as-synthesized zeolite are shown in Table I and for the zeolite after calcination are shown in Table II.

TABLE I

| | As-synthesized CIT-5 | |
|---|---|---|
| 2-Theta[a] | D | Relative Intensity[b] |
| 6.96 | 12.7 | VS |
| 7.29 | 12.12 | S |
| 12.81 | 6.905 | W |
| 13.93 | 6.353 | M |
| 18.96 | 4.676 | S |
| 19.59 | 4.528 | M |
| 20.00 | 4.436 | S |
| 20.50 | 4.329 | M–S |
| 20.95 | 4.236 | S–VS |
| 21.93 | 4.050 | W |
| 23.41 | 3.797 | W |
| 24.22 | 3.672 | W |
| 24.62 | 3.612 | M |
| 25.80 | 3.451 | W |
| 26.10 | 3.412 | W |
| 26.73 | 3.332 | S–VS |
| 27.11 | 3.286 | W |
| 28.22 | 3.159 | M |
| 29.38 | 3.038 | W |
| 29.82 | 2.994 | W |
| 31.37 | 2.849 | W |
| 31.55 | 2.833 | W |
| 32.99 | 2.713 | W |
| 33.98 | 2.636 | W |
| 35.33 | 2.538 | W |
| 35.64 | 2.517 | W |
| 36.42 | 2.465 | W |
| 37.03 | 2.426 | W |

TABLE I-continued

| | As-synthesized CIT-5 | |
|---|---|---|
| 2-Theta[a] | D | Relative Intensity[b] |
| 37.70 | 2.384 | W |
| 38.73 | 2.323 | W |
| 44.70 | 2.026 | W |
| 49.42 | 1.843 | W |

[a]±0.02
[b]The X-ray patterns provided are based on a relative intensity scale in which the strongest line in the X-ray pattern is assigned a value of 100; W (weak) is less than 20; M (medium) is between 20 and 40; S (strong) is between 40 and 60; VS (very strong is greater than 60.

TABLE II

| | Calcined CIT-5 | |
|---|---|---|
| 2-Theta[a] | D | Relative Intensity[b] |
| 6.95 | 12.7 | VS |
| 7.3 | 12.1 | S–VS |
| 13.9 | 6.37 | W–S |
| 19.0 | 4.67 | W–VS |
| 20 | 4.44 | M–VS |
| 20.5 | 4.33 | W–S |
| 20.9 | 4.25 | W–VS |
| 24.6 | 3.62 | W–M |
| 26.8 | 3.32 | W–VS |

The X-ray powder diffraction patterns were determined by standard techniques which are described in detail in U.S. Pat. No. 6,040,258.

As noted above, the pores of CIT-5 will admit all of the isomers of n-pentane and n-hexane, however, the more compact isomers, which include methylbutane, 2,3-dimethylbutane, and 2,2-dimethylbutane, are preferentially adsorbed. While not wishing the invention to be bound by any particular theory as to why metylbutane and the two dimethylbutane isomers are preferentially adsorbed, it may be helpful to briefly discuss what is believed to be the mechanism involved. It is speculated that the methylbutane and dimethylbutane isomers being more compact than n-pentane, n-hexane, or monomethypentane are preferentially adsorbed as a result of entropy. See *Understanding Zeolite Catalysis; Inverse Shape Selectivity Revisited* by Merijn Schenck, et al., Agnew. Chem. Int. Ed. 2002, No. 14, pgs. 2499–2502. According to this theory, the shorter, more compact molecules may be more efficiently packed into the pores of the zeolite than the longer molecules. Accordingly, the more compact molecules when present in sufficient concentration will displace the longer chain molecules.

The preferential adsorption of methylbutane and dimethylbutane may be used as an efficient means for their separation from the other $C_5$ and $C_6$ paraffin isomers. When a hydrocarbon stream containing the various isomers of pentane and hexane are passed over a catalyst bed comprising CIT-5, the CIT-5 will preferentially adsorb the methylbutane and dimethylbutane. The phrase "preferentially adsorb" implies that while all of the isomers of pentane and hexane will be adsorbed, the methylbutane and dimethylbutane will be preferred if they are present in sufficient concentration to displace the other isomers. Thus the pores in the zeolite will become saturated with the preferred isomers if they are presented in sufficient concentration. Although the adsorption of the favored isomers will proceed over a wide range of temperatures and pressures, it has been observed that the adsorptive efficiency of the zeolite in separating the favored isomers generally improves as the temperature and pressure increases. Therefore, it is usually desirable to operate at the highest temperature and pressure which is practical from a technical and economic perspective.

U.S. Pat. No. 5,107,052 describes a three step process for producing a high octane fuel in which the first step is an isomerization reaction where the $C_4$ to $C_6$ paraffins are isomerized, the second step involves the selective adsorption of the branched chain isomers from the isomerate by a molecular sieve selected from the group of SAPO-5, $AlPO_4$-5, SSZ-24, MgAPO-5, and MAPSO-5, and the final step consists of the desorption of the higher octane isomers using a desorbent. While an CFI zeolite generally, and CIT-5 in particularly, may be substituted as an adsorbent for the catalysts that are disclosed in this reference, it has been found that by using the unique properties of the CFI zeolite it is possible to efficiently recover the methylbutane and dimethylbutane from the zeolite by the use of catalytic distillation. By using catalytic distillation to recover the dimethylbutane, the recovery operation may be performed in the same vessel as the hydroisomerization and separation steps. Thus not only is the isomerization operation reduced from three steps to two steps but the number of vessels required can be reduced to one by use of the process of the present invention. This significantly lowers the capital and operating costs of the isomerization and separation operation.

In one embodiment of the present invention, the $C_5$ and $C_6$ paraffins are selectively isomerized to methylbutane and dimethylbutane, respectively, using CFI zeolite as the hydroisomerization catalyst. The CFI zeolite may be used in the process without an active metal being present on the zeolite, but it is generally preferred that the catalyst contain an effective hydroisomerization amount of one or more active metals selected from Group VIIIA of the Periodic Table of the Elements. Group VIIIA includes the noble metals platinum, palladium, and iridium. Particularly preferred for use as the active metal are platinum, palladium or a mixture of platinum and palladium. The active metal is generally placed on the zeolite as a compound of the metal using methods which are well known in the art. As used herein the term an "effective hydroisomerization amount" refers to that loading of active metal on the catalyst which is effective to isomerize the paraffins under the conditions present in the hydrisomerization zone. Generally the amount of metal present will exceed 0.01 weight percent metal, and preferably will fall within the range from about 0.1 to about 1.0 weight percent.

In carrying out the isomerization process, the hydrocarbon feed is preferably a light naphtha in order to minimize the amount of feed passing through the hydroisomerization zone. Since olefins, sulfur, nitrogen, and water tend to deactivate the catalyst, it is generally desirable to reduce the amount of these contaminants in the feed prior to their contacting the hydroisomerization catalyst. The isomerization reaction is carried out in the presence of hydrogen. Typically this process operates at temperatures above about 465 degrees F. (about 240 degrees C.), 30 bar, and a hydrogen to hydrocarbon ratio of about 2.5.

Catalytic distillation is a method for separating the methybutane and dimethylbutane from the other $C_5$ and $C_6$ paraffins after they have been adsorbed by the CFI zeolite using the same vessel. A general description of the catalytic distillation process may be found in *More uses for catalytic distillation* by G. G. Podrebarac, et al. in Chemtech, May, 1997, pgs. 37–45. Catalytic distillation is particularly useful for the separation of the high RON isomers following hydroisomerization, since they have a lower boiling point than the longer chain isomers which have a lower RON. Note the boiling points given in degrees C. for each of the isomers of $C_5$ and $C_6$ paraffins listed below:

| | |
|---|---|
| n-pentane | 36.1 |
| methylbutane | 27.9 |
| n-hexane | 68.7 |
| 2-methylpentane | 60.3 |
| 3-methylpentane | 63.3 |
| 2,2-dimethylbutane | 49.7 |
| 2,3-dimethylbutane | 58.0 |

It should be noted that those isomers having the highest RON also display significantly lower boiling points than the isomers of those paraffins having the same number of carbon atoms and the lower RON. During the hydroisomerization reaction, the reactor is maintained at a temperature equivalent to the boiling point of the liquid in the column. Since the boiling point of the liquid in the column may vary depending on the pressure in the reactor, there is some flexibility in the temperature at which the reactor must be maintained. In catalytic distillation, the lowest boiling liquid in the column may be separated from the other liquids present having a higher boiling point. For example, in the process of the present invention, the dimethylbutane has a lower boiling point than the other isomers of $C_6$ paraffin, therefore, it is relatively easy to recover the dimethylbutane by simply distilling off the lower boiling material in the column. The same principle holds true for separating methylbutane from n-pentane. Mixtures containing isomers of both $C_5$ and $C_6$ paraffins may be separated by successively distilling off the lowest boiling liquids.

When employed in a hydrocracking operation, the CFI zeolite is employed in combination with a conventional hydrocracking catalyst suitable for maximizing the production of naphtha, such as, for example, Y-zeolite. The cracking catalyst should also have a hydrogenation component such as an effective amount of a Group VIIIA or Group VIB metal. As used herein an effective hydrocracking amount of the active metal refers to the amount of metal loaded onto the catalyst to catalyze the cracking reaction under the conditions present in the hydrocracking zone. The cracking reaction is carried out in the presence of free hydrogen. Typical hydrocracking conditions include an overall LHSV of about 0.1 hr-1 to about 15.0 hr-1 (v/v), preferably from about 0.25 hr-1 to about 2.5 hr-1. The reaction pressure generally ranges from about 500 psig to about 3500 psig (about 10.4 MPa to about 24.2 MPa, preferably from about 1500 psig to about 5000 psig (about 3.5 MPa to about 34.5 MPa). Hydrogen consumption is typically from about 500 to about 2500 SCF per barrel of feed (89.1 to 445 m3 H2/m3 feed). Temperatures in the reactor will range from about 400 degrees F. to about 950 degrees F. (about 205 degrees C. to about 510 degrees C.), preferably ranging from about 650 degrees F. to about 850 degrees F. (about 340 degrees C. to about 455 degrees C.).

As noted earlier, the CFI zeolite, while having some cracking activity of its own, is primarily intended in this embodiment of the invention to isomerize the $C_5$ and $C_6$ paraffins either already present in the feed or produced by the cracking of the feedstock. Accordingly, the CFI zeolite will preferably contain an effective hydroisomerization amount of a Group VIIIA metal, preferably platinum or palladium or a combination of platinum and palladium. While the CIT-5 may be used in the hydrocracking reactor of a single stage hydrocracking operation, it is more advantageous to use the CFI zeolite in the second stage of a two-stage hydrocracking operation. Use in the second stage will slow the coking of the catalyst and prolong its useful life.

A two-stage hydrocracking operation contains two hydrocracking zones in which the hydrocrackate or effluent from the first hydrocracking zone is passed to the second hydrocracking zone. In this configuration, the first stage usually will remove most of the contaminants present in the feed stock allowing for the use of more contaminant sensitive catalysts in the second stage. In addition, gaseous by-products, such as hydrogen sulfide and ammonia, are preferably removed from the effluent prior to its introduction into the second stage. Two-stage hydrocracking operations may utilize two separate reactor vessels or use a single vessel in which the first stage and second stage catalysts are "stacked" in the reactor vessel.

Suitable hydrocracking catalysts which may be mixed with the CIT-5 are well known in the art. See for example U.S. Pat. Nos. 4,347,121 and 4,810,357, the contents of which are hereby incorporated by reference in their entirety, for general descriptions of typical hydrocracking catalysts. Suitable hydrocracking catalysts include noble metals from Group VIIIA, such as platinum or palladium on an alumina or siliceous matrix, and Group VIB metals, such as nickel-molybdenum or nickel-tin on an alumina or siliceous matrix. The non-noble hydrogenation metals, such as nickel-molybdenum, are usually present in the final catalyst composition as oxides, but are usually employed in their reduced or sulfided forms when such sulfide compounds are readily formed from the particular metal involved. Preferred non-noble metal catalyst compositions contain in excess of about 5 weight percent, preferably about 5 to about 40 weight percent molybdenum and/or tungsten, and at least about 0.5, and generally about 1 to about 15 weight percent of nickel and/or cobalt determined as the corresponding oxides. Catalysts containing noble metals, such as platinum, contain in excess of 0.01 percent metal, preferably between about 0.1 weight percent and about 1.0 weight percent metal. Combinations of noble metals may also be used, such as mixtures of platinum and palladium.

The hydrogenation components can be incorporated into the overall hydrocracking catalyst composition by any one of numerous procedures. The hydrogenation components can be added to matrix component by co-mulling, impregnation, or ion exchange and the Group VIB components, i.e.; molybdenum and tungsten can be combined with the refractory oxide by impregnation, co-mulling or co-precipitation.

The matrix component for the hydrocracking catalyst can be of many types including some that have acidic catalytic activity. Ones that have activity include amorphous silica-alumina or zeolitic or non-zeolitic crystalline molecular sieves. Examples of suitable matrix molecular sieves include zeolite Y, zeolite X and the so called ultra stable zeolite Y and high structural silica-alumina ratio zeolite Y such as that described in U.S. Pat. Nos. 4,401,556; 4,820,402; and 5,059,567. Small crystal size zeolite Y, such as that described in U.S. Pat. No. 5,073,530 can also be used. Non-zeolitic molecular sieves which can be used include, for example, silicoaluminophosphates (SAPO), ferroaluminophosphate, titanium aluminophosphate and the various ELAPO molecular sieves described in U.S. Pat. No. 4,913,799 and the references cited therein. Details regarding the preparation of various non-zeolite molecular sieves can be found in U.S. Pat. Nos. 5,114,563 (SAPO) and 4,913,799 and the various references cited in U.S. Pat. No. 4,913,799. Mesoporous molecular sieves can also be used, for example the M41S family of materials as described in *J. Am. Chem. Soc.*, 114:10834–10843(1992)), MCM-41; U.S. Pat. Nos. 5,246,689; 5,198,203; and 5,334,368; and MCM-48 (Kresge et al., *Nature* 359:710 (1992)). Suitable matrix materials may also include synthetic or natural substances as well as inorganic materials such as clay, silica and/or metal oxides such as silica-alumina, silica-magnesia, silica-zirconia, silica-thoria, silica-berylia, silica-titania as well as ternary compositions, such as silica-alumina-thoria, silica-alumina-zirconia, silica-alumina-magnesia, and silica-magnesia zirconia. The latter may be either naturally occurring or in the form of gelatinous precipitates or gels including mixtures of silica and metal oxides. Naturally occurring clays which can be composited with the catalyst include those of the montmorillonite and kaolin families. These clays can be used in the raw state as originally mined or initially subjected to dealumination, acid treatment or chemical modification.

In carrying out the present invention, those hydrocracking catalyst which maximize the production of naphtha, particularly light naphtha are preferred. Thus acidic hydrocracking catalysts, such as, for example, Y-zeolites, are particularly preferred for admixture with the CFI zeolite.

What is claimed is:

1. A process for producing a high RON naphtha which comprises contacting a hydrocarbon feed stream comprising a mixture of the isomers of $C_5$ and $C_6$ paraffins with CFI zeolite in an adsorption zone, whereby the branched isomers of the $C_5$ and $C_6$ paraffins are preferentially adsorbed by the CFI zeolite as compared to the straight chain isomers, desorbing the branched isomers of the $C_5$ and $C_6$ paraffins from the CFI zeolite, and recovering a naphtha product from the adsorption zone having a higher RON than the hydrocarbon feed stream wherein the adsorption zone is maintained under hydroisomerization conditions and the CFI zeolite also serves as a hydroisomerization catalyst to selectively isomerize pentane to methylbutane and isomerize monomethylpentane and n-hexane to dimethylbutane.

2. The process of claim 1 wherein the hydrocarbon feed stream is a light naphtha.

3. The process of claim 2 wherein the RON of the naphtha product is increased by at least 2 octane numbers as compared to the light naphtha feed stream.

4. The process of claim 1 wherein the naphtha product has a RON of at least 85.

5. The process of claim 1 wherein methylbutane and dimethylbutane present in the light naphtha feed stream are preferentially recovered as compared to the n-pentane, monomethylpentane and the n-hexane present.

6. The process of claim 5 wherein the methylbutane and dimethylbutane are recovered from the adsorption zone by catalytic distillation.

7. The process of claim 1 wherein the CFI zeolite contains an effective hydroisomerization amount of at least one active metal selected from Group VIIIA of the Periodic Table of the Elements.

8. The process of claim 7 wherein the active metal is selected from one of platinum, palladium, or a combination of platinum and palladium.

9. The process of claim 1 wherein the adsorption zone is maintained under hydrocracking condition and the CFI zeolite is one component of a hydrocracking catalyst system comprising the CFI zeolite, an active hydrocracking catalyst, and an effective amount of a hydrogenation component.

10. The process of claim 9 wherein the hydrogenation component comprises at least one active metal selected from Group VIIIA or Group VIB of the Periodic Table of the Elements.

11. The process of claim 10 wherein the separation zone represents the second stage of a two stage hydrocracking operation.

12. The process of claim 1 wherein the CFI zeolite is CIT-5.

13. A process for isomerizing a light naphtha feed stream comprising isomers of $C_5$ and $C_6$ paraffins which comprises contacting the light naphtha feed stream with an CFI zeolite in a hydroisomerization zone under hydroisomerization conditions, whereby the isomer methylbutane is preferentially formed as compared to n-pentane and the isomer dimethylbutane is preferentially formed as compared to monomethylpentane and n-hexane, adsorbing the methylbutane and dimethylbutane on the CFI zeolite, and recovering from the hydroisomerization zone by catalytic distillation a naphtha product stream enriched with methylbutane and dimethylbutane.

14. The process of claim 13 wherein the CFI zeolite is CIT-5.

15. The process of claim 14 wherein the CIT-5 contains an effective amount of at least one active metal selected from Group VIIIA of the Periodic Table of the Elements.

16. The process of claim 15 wherein the active metal is selected from one of platinum, palladium, or a combination of platinum and palladium.

17. A process for preparing gasoline having a high RON and low oxygenates which comprises contacting a hydrocarbon feed stream in a hydrocracking zone with a hydrocracking catalyst under hydrocracking conditions, wherein the hydrocracking catalyst comprises an CFI zeolite, an active hydrocracking catalyst, and a hydrogenation component, selectively adsorbing methylbutane and dimethylbutane on the CFI zeolite, desorbing the methylbutane and dimethyl butane from the CFI zeolite, and recovering from the hydrocracking zone a methylbutane and dimethylbutane enriched naphtha product.

18. The process of claim 17 wherein the process includes a first hydrocracking zone and a second hydrocracking zone wherein the effluent from the first hydrocracking zone is passed to the second hydrocracking zone and the hydrocracking catalyst containing the CFI zeolite is in the second hydrocracking zone.

19. The process of claim 17 wherein the CFI zeolite is CIT-5.

20. The process of claim 19 wherein the hydrogenation component comprises at least one active metal selected from Group VIIIA or Group VIB of the Periodic Table of the Elements.

21. The process of claim 20 wherein the dimethylbutane and methylbutane enriched naphtha product has a RON of at least 85.

22. The process of claim 20 wherein the dimethylbutane and methylbutane enriched naphtha product has a RON of at least 90.

* * * * *